(12) United States Patent  (10) Patent No.: US 8,469,074 B2
Ko  (45) Date of Patent: Jun. 25, 2013

(54) PRESSURE CONTROL MECHANISM FOR ADHESIVE THERMAL COMPRESSION BONDING MACHINES

(76) Inventor: Kwangwoo Michael Ko, White Bear Lake, MN (US)

( * ) Notice: Subject to any disclaimer, the term of this patent is extended or adjusted under 35 U.S.C. 154(b) by 629 days.

(21) Appl. No.: 12/468,357

(22) Filed: May 19, 2009

(65) Prior Publication Data

US 2009/0283198 A1    Nov. 19, 2009

Related U.S. Application Data

(60) Provisional application No. 61/128,170, filed on May 19, 2008.

(51) Int. Cl.
*B30B 15/34* (2006.01)

(52) U.S. Cl.
USPC ............ 156/583.91; 156/581; 156/583.1; 100/295

(58) Field of Classification Search
USPC .. 156/358, 580, 581, 583.1, 583.91; 100/232, 100/295, 315, 317, 318, 320
See application file for complete search history.

(56) References Cited

U.S. PATENT DOCUMENTS

| | | | | |
|---|---|---|---|---|
| 6,092,578 A | * | 7/2000 | Machida et al. | 156/358 |
| 2004/0089415 A1 | * | 5/2004 | Byun et al. | 156/285 |
| 2004/0114095 A1 | * | 6/2004 | Lee et al. | 349/187 |
| 2006/0096709 A1 | * | 5/2006 | Lee et al. | 156/382 |

FOREIGN PATENT DOCUMENTS

WO    WO 2005092602 A1 * 10/2005

\* cited by examiner

*Primary Examiner* — John Goff
(74) *Attorney, Agent, or Firm* — James W. Miller

(57) ABSTRACT

Mechanism for controlling pressure during the adhesive thermal compression bonding provides benefits of higher production yield, improved adhesive bonding performance and quality. Springs and pneumatic pistons are utilized to provide improved pressure control during the adhesive thermal compression bonding process. All production parts have certain geometric tolerances and automatically accommodating these tolerances increases production yield by reducing waste of incompletely adhesive bonded parts. The gaps caused by the parts tolerance are closed in a controlled manner using the mechanism and the pressure is controlled for effective adhesive bonding.

11 Claims, 5 Drawing Sheets

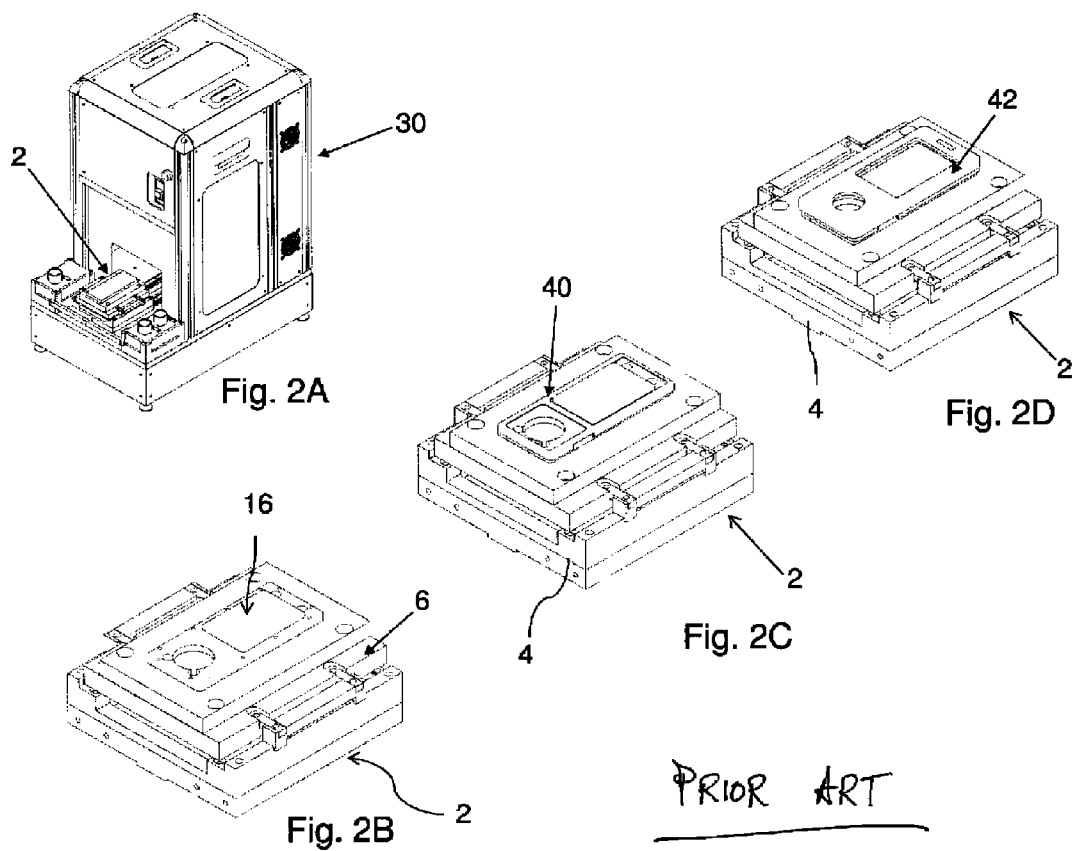

PRESSURE CONTROL MECHANISM FOR ADHESIVE THERMAL COMPRESSION BONDING MACHINES

CROSS REFERENCE TO RELATED APPLICATIONS

This application claims the benefit of previously filed provisional Application Ser. No. 61/128,170, filed May 19, 2008.

TECHNICAL FIELD

This invention relates to a pressure control mechanism for thermal compression bonding machines utilized in assembling parts using adhesives.

BACKGROUND OF THE INVENTION

Die-cuts of various adhesive materials, as in adhesive tapes and bonding films, are used to mechanically assemble various components or parts together. In these instances, adhesive die-cuts are typically placed between two (2) parts to join them together. In its simplest form, appropriate pressure for a recommended period of time is applied to two parts stacked on top of each other with a pressure sensitive adhesive (PSA) die-cut sandwiched between them for assembly. In general, PSA tape die-cuts need moderate pressure in the range of about 15 psi for a few seconds to bond parts at normal room temperature.

For certain assembly applications, thermal compression bonding is used to achieve both improved physical contact between the parts and the PSA die-cut used to hold the parts together as well as higher initial bonding strength. Adhesive bonding film die-cuts, either thermoset or thermoplastic, typically require heat and pressure for a period of time to achieve bonding. For thermoset materials, the heat chemically cures the adhesive. For thermoplastic materials, the heat softens the material for proper wetting onto the surfaces of the parts to be assembled. The temperature range for heating the bonding films depends on the material choice and is typically about 70° C. to 200° C.

Adhesive die-cuts are usually manufactured by cutting chosen adhesive materials into desired geometric patterns. Typically, for organic materials such as films, adhesive tapes, pads, foams and others, mechanical stamping dies are used to manufacture the die-cuts. Computer controlled cutting tools, such as knife and laser cutters, could also be used. In addition, other means can be employed to manufacture die-cuts as well.

Thermal compression bonding machines 30 (see FIGS. 1A-1D) used in the industry today have common fundamental components: pneumatic cylinders 32, heating blocks 34, top fixtures 36 that are part of heating blocks 34 or are heated by heating blocks 34, bottom fixtures that periodically are brought into a pressing or abutting engagement with the top fixtures 36, electronic controllers, and timers. Some machines 30 also have conveyors for moving the parts into and out of the machine 30. FIGS. 1A and 1B show a thermal compression bonding machine 30 having two work stations that are generally identical to one another, namely a left work station 38*l* and a right work station 38*r*. FIGS. 1C and 1D show a single work station inside a thermal compression bonding machine 30. Obviously, compression bonding machine 30 may have different numbers of work stations 38.

The top fixtures 36 and their mating bottom fixtures are typically CNC machined according to the 3D geometry of the parts to be assembled. The fixtures secure the parts and prevent them from shifting during the thermal compression bonding process and while conveying the parts inside the machine. The pneumatic cylinders 30 are used to apply force to the stacked parts. The heating blocks 34 and timers are used to deliver heat for a set duration of time to the stacked parts to achieve a certain peak temperature range. In some cases as shown in FIGS. 1C and 1D, a cooling station having a cooling block 39 that cools a top fixture 36 is incorporated in the machine 30 to cool the assembled parts after the heating cycle.

In a typical thermal compression bonding process, two (2) parts 40 and 42 with adhesive (not shown) sandwiched between them (see FIG. 2) are loaded into the machine 30. By way of example but not limitation, the parts 40 and 42 shown in FIG. 2 are various parts of a case or housing of a cell phone. The bottom part 40 is laid atop or nested onto the bottom fixture 16 as shown in FIG. 2C. The top part 42 is then laid on top of the bottom part 40 with adhesive sandwiched between the top and bottom parts, the adhesive typically being in the form of a die-cut whose geometry mimics the contact surfaces of the top and bottom parts 40 and 42. Since the bottom part 40 is nested onto the bottom fixture 16, this nesting secures the entire assembly of the bottom part 40, sandwiched adhesive (not shown), and top part 42 to the bottom fixture 16 during conveying inside the machine 30 and prevents shifting of the assembly on the bottom fixture 16 while compression force is applied thereto by top fixture 36.

The machine 30 is programmed with a set temperature for the heating blocks 34 and time duration for heating. The top fixture 36 that conforms to the 3D surface geometry of the top part 42 is mounted to the heating block 34 which is attached to the piston of the pneumatic cylinder 32. The piston 32/heating block 34/top fixture 36 assembly travels downward to a set height and applies force to the stacked parts 40 and 42 by compressing the parts 40 and 42 between the top and bottom fixtures 36 and 16. For a cooling cycle, cooling air may be channeled into the top fixture 36 and/or bottom fixtures 16 to cool the assembled parts after the heating cycle. In some machines, simple spring mechanisms or conformable pads are used to apply cushioning during the compression.

All production parts, such as the parts 40 and 42, have geometric tolerances as they are mass manufactured. These part tolerances largely determine the required minimum thickness of the adhesive, selection of the adhesive, assembly yield and reliability of the adhesive assembled parts. As a rule of thumb, the minimum adhesive thickness is twice the combined tolerance of the parts. As an example, if part A has a coplanarity tolerance of 50 microns and part B has a coplanarity tolerance of 100 microns, the minimum adhesive thickness would be 300 microns. The idea behind this general guideline is to have enough adhesive material to fill the gap created by the stacking tolerance of the two (2) parts to have cohesive strength of the adhesive.

For assembly of high volume production parts using thermal compression adhesive bonding, the production yield, the strength and the quality of the adhesive bonding depend on the geometric tolerance of the parts. The adhesive must be in intimate contact with the surfaces of the parts to physically bond the parts. Gaps exist between the surfaces of production parts because of geometric tolerances that are inherent during the manufacture of the parts themselves. Across the contact surfaces of parts, if there are numerous locations with gaps larger than the thickness of the adhesive, the bonding performance would be lower than optimum and the quality would be inconsistent. For gaps that are substantially larger than the thickness of the adhesive and located at critical locations, the bonding assembly yield would be low because of incomplete adhesive bonding not satisfying the minimum bonding strength requirement.

As noted earlier above, in thermal compression bonding of adhesives, the typical equipment used in the industry has means to heat the adhesive via conduction and apply compressive force to the stacked parts. In most cases, pneumatic cylinders 32 are used to apply the force (see FIGS. 1A-1D). Other means of applying force are via motors and combinations of motors and pneumatic cylinders. For proper adhesive bonding, the temperature, the time, and the pressure ranges need to be controlled for the chosen adhesive. For thermal compression bonding of thermoplastic adhesive bonding films, the softening temperature of the film need to be achieved in the heating stage using proper pressure and the adhesive needs to be cooled under proper compression to achieve adhesive bonding.

Current thermal compression adhesive bonding machines in the industry control the distance the piston of the pneumatic cylinder travels by adjusting the stopping position of the piston in relation to the top of the stacked parts. In such cases, the stopping position of the cylinder piston is adjusted to control the push-down distance of the stacked parts. This distance is equal to the partial thickness of the adhesive and is difficult to control across the tolerance range of the parts. This method exerts a force on the parts that is equal to the force exerted by the compressed air onto the area of the piston. This force can be much greater than the desired force needed for thermal compression bonding.

In addition, the Z-direction geometric tolerances of the stacked production parts affect the relative distance between the top of the stacked parts and the bottom of the piston in its extended state. Depending on the tolerances of the stacked parts, the heating and the cooling fixtures attached to the bottom of the cylinder may not make contact with the top of the stacked parts. Pressure control over the tolerance range of the production parts is difficult. This may result in a longer time to set up the machine using a trial and error method of testing. As new production tools are added for the increase in mass production of parts, the machine needs to be set up again for the changes in the tolerance range of parts.

Some machines use springs or elastomeric materials to cushion the piston force at the moment of contact with the stacked parts. Some machines in the industry use compression of springs as the only mechanism of distributing the pressure. Another simple means of controlling the force and its resultant pressure is adjusting the input air pressure to the cylinder and using the areas of the piston and common contact area of the parts to be assembled. The shortcoming of this method is that the force exerted by the piston varies as the input air pressure fluctuates.

SUMMARY OF THE INVENTION

One aspect of this invention comprises the use of springs and a series of pneumatic pistons to achieve desired pressure control on a pair of parts that are being joined together using an adhesive during the compression stages of compression bonding. The springs have selected compression constants and are compressed to a pre-determined compression length to apply calculated force over the contact area of the parts achieving desired pressure distribution. In concert with the springs, the pneumatic pistons can additionally apply a controlled force over the effective area of the parts if needed to achieve desired pressure distribution.

Another aspect of this invention comprises a combination of springs and pneumatic pistons that is used to achieve desired pressure distribution accurately during the heating and cooling cycles of thermal compression adhesive bonding. In the heating stage, pressure is applied to evenly heat the adhesive between the parts to a desired peak temperature range. The heat transfer rate depends on the set temperature of the heating blocks and the pressure applied. With higher pressure, the conductive heat transfer rate is higher. In heating thermoplastic bonding films, higher than optimum pressure or uneven pressure distribution could cause the softened adhesives to flow outside the footprint of the parts causing cosmetic defects. In the cooling stage, pressure is applied to cool the parts assembly by conduction. In many cases, compressed air is used to cool the parts in a shorter time period. For thermoplastic bonding films, the pressure control at the cooling stage is more critical because the act of adhesive bonding occurs during cooling as the softened bonding film solidifies and bonds the two parts together. Using the springs and pistons of this invention, desired pressure levels and desired pressure distributions are achieved more efficiently and accurately.

Yet another aspect of this invention is automatically accommodating the geometric tolerance of the parts to be bonded with adhesives. While the stacked parts are under compression, a series of pneumatic pistons push the lower part against the upper part with a controlled force to close the gap created by the parts tolerance. The pistons push on the part until the gap is closed and then the piston force is distributed over effective area to achieve desired pressure distribution. Each piston can be controlled independently or in groups by use of solenoid valves and pressure regulators. The benefit of this feature is higher adhesive bonding yield and more consistent bonding quality.

BRIEF DESCRIPTION OF THE DRAWINGS

This invention will be described more completely in the following Detailed Description, when taken in conjunction with the following drawings.

FIGS. 2A-2D are diagrammatic views of one embodiment of the pressure control mechanism of this invention, particularly illustrating the bottom fixture (nest) and a plurality of parts nesting on the bottom fixture with the parts comprising various components of the case or housing of an electronic device, such as the case or housing of a cell phone;

DETAILED DESCRIPTION

Referring now to FIGS. 2-5, one aspect of this invention comprises a pressure control mechanism 2 used as part of an improved compression bonding machine 30. See FIG. 2A. The bonding machine 30 is preferably an adhesive thermal compression bonding machine, but mechanism 2 is not limited for use in this type of bonding machine. Mechanism 2 consists in part of springs and pneumatic pistons for controlling pressure applied to the stacked parts being joined together. The benefits are higher production yield by minimizing the cosmetic defects caused by adhesive squeeze and by achieving better adhesive bonding of parts by closing the gaps caused by parts tolerances in the parts themselves. An additional benefit is more consistent adhesive bonding strength for production parts within the tested range of tolerances of the parts by efficiently and accurately achieving a desired pressure distribution on the parts.

Figure 4:
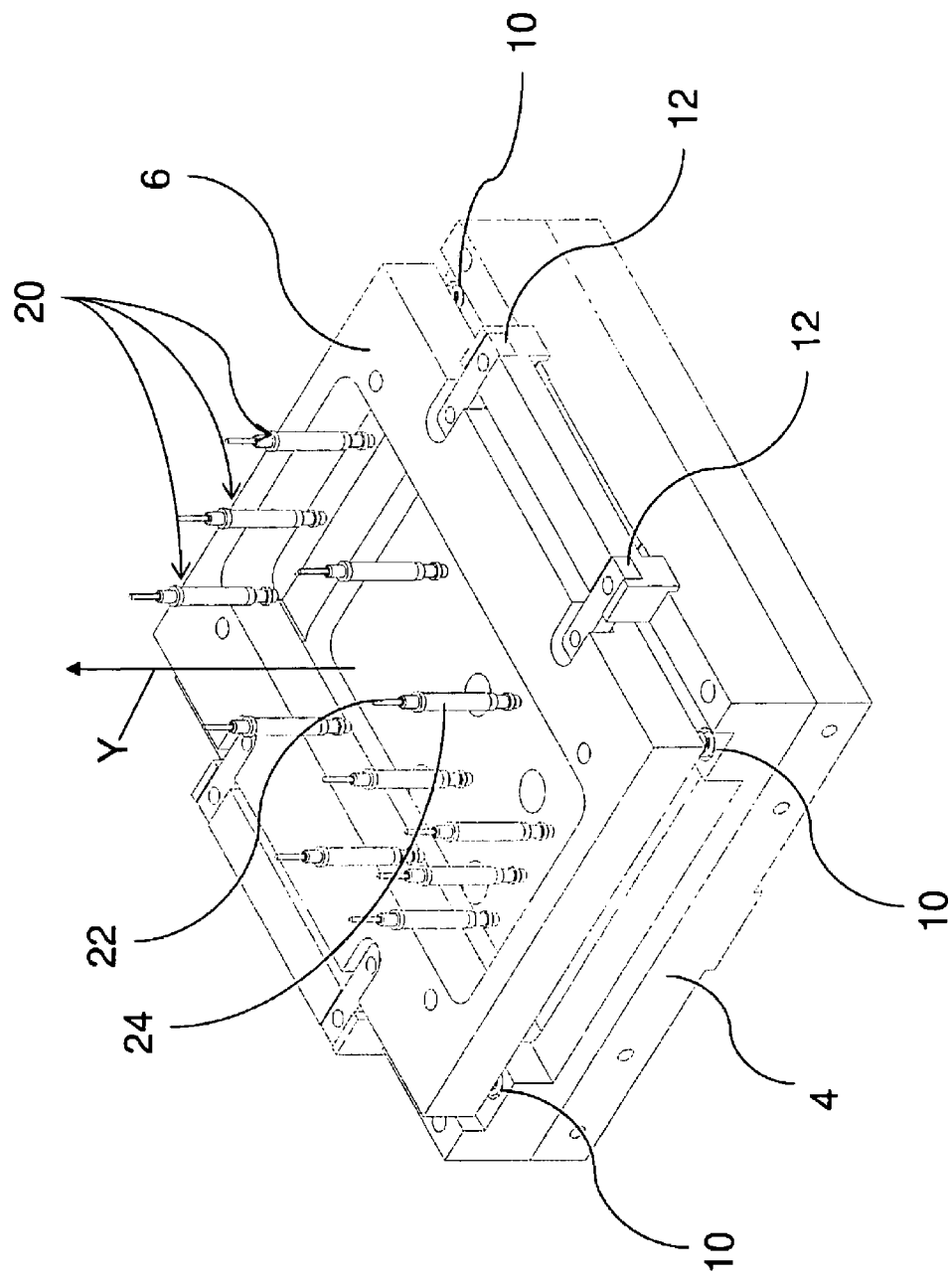
FIG. 4 is a diagrammatic view of the pressure control mechanism of FIG. 3, but without the bottom fixture (nest)
Figure 5:
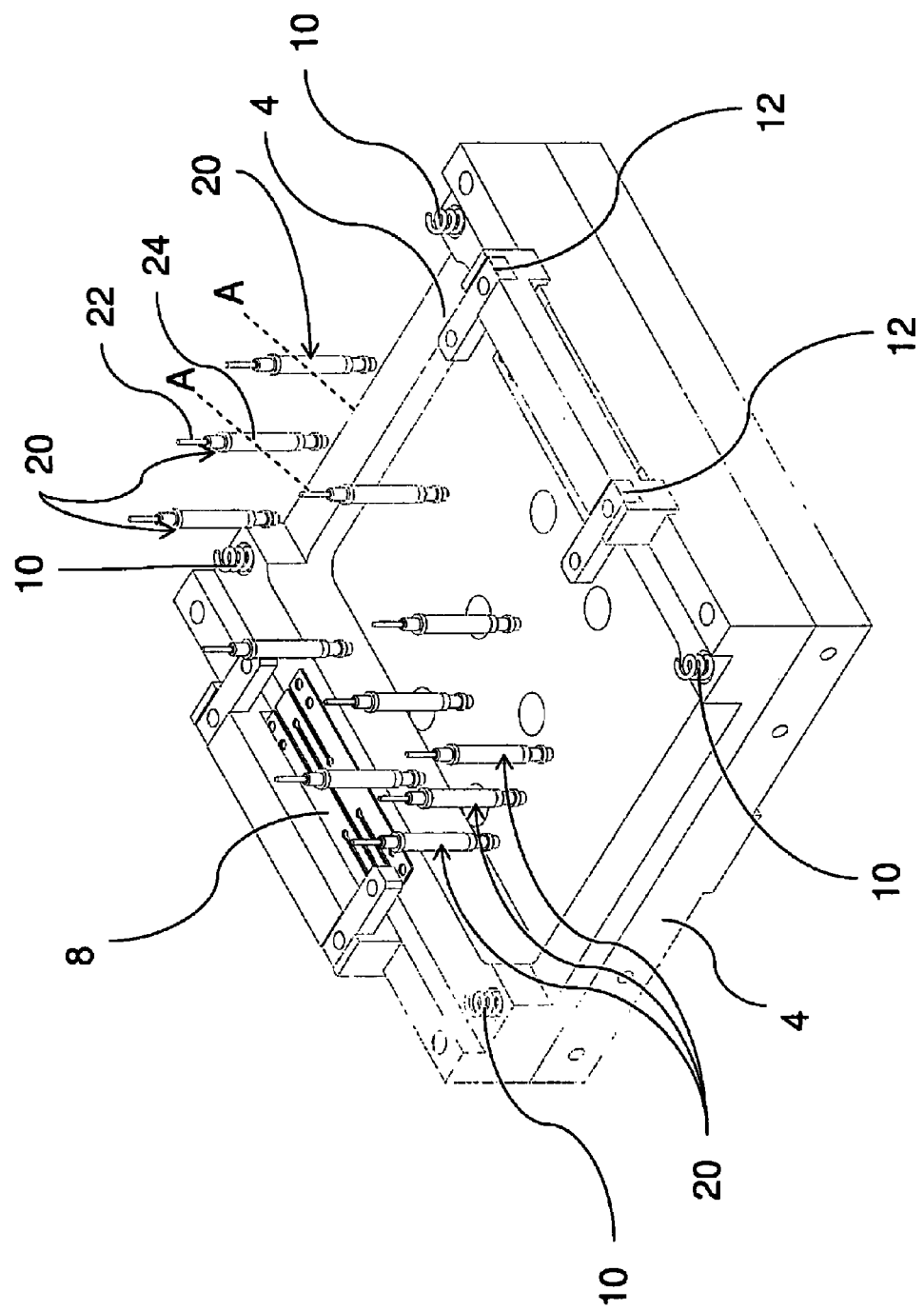
FIG. 5 is FIG. 4 without the mounting plate for the bottom fixture (nest).

Referring now to FIGS. 4 and 5, mechanism 2 includes a fixed base 4 that is part of the bonding machine. A mounting plate 6 is attached by a pair of torsion plates 8 to base 4. One such torsion plate 8 is shown in FIG. 5 with an identical torsion plate 8 on the opposite side of base 4 being hidden from view in FIG. 5. Each torsion plate 8 is like a hinge that is spring biased to always attempt to maintain a planar configuration in which each side of the hinge is flat and coplanar with the other side of the hinge. One side of each torsion plate 8 is attached to base 4 and the other side of each torsion plate 8 is attached to an underside of mounting plate 6. Torsion plates 8 establish an initial starting position for mounting plate 6 relative to base 4 at the beginning of each part assembly cycle and reliably return mounting plate 6 to the same initial starting position after each part assembly cycle.

A plurality of compression springs 10 are positioned between base 4 and mounting plate 6. One spring 10 is located in a pocket or recess at each corner of base 4. Each spring 10 extends upwardly out of base 4 and bears against the underside of mounting plate 6. Mounting plate 6 is free to move or travel vertically relative to base 4 in the vertical Y-direction (see FIG. 4). A plurality of stops 12 project from base 4 into a plurality of recesses 14 in mounting plate 6 to locate mounting plate 6 in its initial starting position. The recesses 14 in mounting plate 6 will abut or engage against stops 12 when torsion plates 8 are horizontal and an assembly cycle is about to begin.

As the compressive force is applied during the compression bonding process, each spring 10 compresses independently. Springs 10 are selected based on their compression constant when compressed by a set distance during the compression bonding process to apply a calculated force over the contact area of the parts to achieve a desired pressure distribution. The contact area is the common surface area of the parts that are to be assembled using the adhesive and in contact with the fixtures of the compression bonding machine. Hooke's law is used to first calculate the relationship among the force, spring constant and compression distance. The system is tested and calibrated for higher accuracy. The quantity of springs 10 and their spring constants can be selected for the desired pressure distribution. For a higher pressure range greater than the amount achievable by the maximum compression distance used in the compression bonding process, either more springs 10 or springs 10 with a higher compression constant or the combination of both could be used to increase the force exerted by springs 10.

Figure 3:
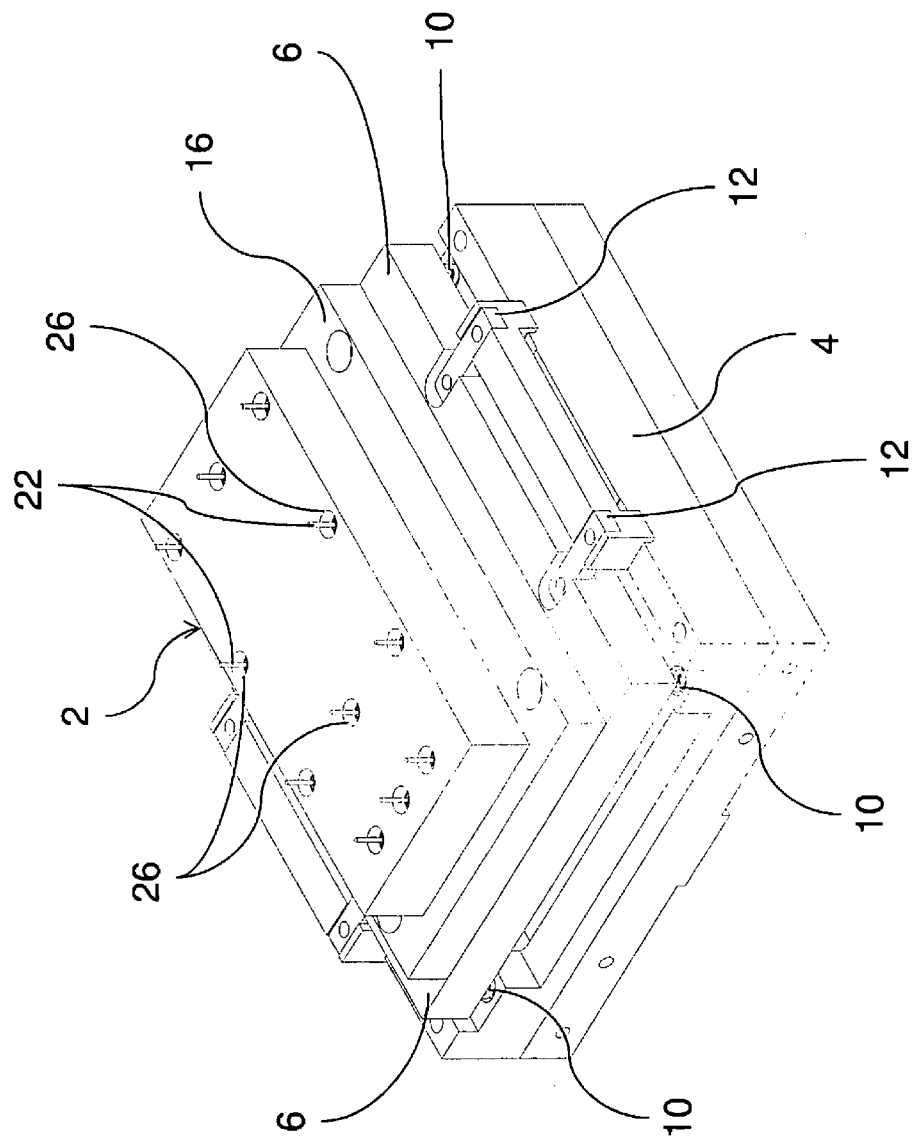
FIG. 3 is an enlarged diagrammatic view of the embodiment of the pressure control mechanism of this invention shown in FIG. 2, particularly illustrating the pressure control mechanism with the bottom fixture (nest) in place.

A nest or bottom fixture 16 is bolted to mounting plate 6 as shown in FIG. 3. Thus, bottom fixture 16 rises and falls with mounting plate 6 as mounting plate 6 rises and falls relative to base 4. Some portion of the bottom part (in the assembly of the bottom part, sandwiched adhesive and top part) will nest or be received on bottom fixture 16 in a manner that is typical of compression bonding machines. This serves to locate the bottom part, sandwiched adhesive, and top part that are being joined together by the bonding machine in the compression bonding process.

A plurality of small pneumatic pistons 20 are imbedded in and carried by bottom fixture 16. Each piston 20 has a head 22 that can be extended or retracted from a cylinder 24. Each cylinder 24 is fixed to bottom fixture 16 with head 22 extending upwardly through an opening 26 in the top surface of bottom fixture. Referring to FIGS. 4 and 5, mounting plate 6 and base 4 have central openings or cavities to accommodate the lower portions of cylinders 24 and to permit pneumatic hoses to be joined to the lower portions of cylinders 24 for supplying compressed air to cylinders 24. When such air is so supplied, heads 22 will be extended upwardly out of their cylinders 24.

Pneumatic pistons 20 are positioned strategically, and in most cases approximately uniformly, over the contact area of the top and bottom parts to apply controlled force on the parts to achieve the desired pressure distribution. In one embodiment, pneumatic hoses (not shown) connect piston cylinders 24 to an air pressure regulator (not shown) via a common manifold (not shown). The force provided by each piston 20 is controlled by the air pressure setting on the pressure regulator.

The total force exerted collectively by pistons 20 is distributed over the effective contact area between the top and bottom parts to provide uniform pressure distribution. The type of piston 20 is selected for the desired force range. For most contact area geometries in the parts, the effective pressure distribution length is approximately equal to the pitch or distance between pistons 20. In most cases, pistons 20 are used while the stacked top and bottom parts are under controlled compression by use of springs 10. The total pressure on the stacked parts is the sum of the pressure provided by springs 10 and the pressure provided by pistons 20. Pistons 20 can be controlled individually or in groups by using a plurality of pressure regulators and/or manifolds by and by adjusting the air pressure of the different pressure regulators. This control scheme enables achieving desired pressure distribution by adjusting the piston location and the air pressure on the regulator.

Mechanism 2 consisting of springs 10 and pneumatic pistons 20 provide the necessary pressure control during both the heating and cooling stages of thermal compression bonding for effective and accurate pressure distribution control. In addition, pneumatic pistons 20 mechanically close the gaps caused by parts tolerances to achieve higher production yield and increase adhesive bonding quality.

Figure 1A:
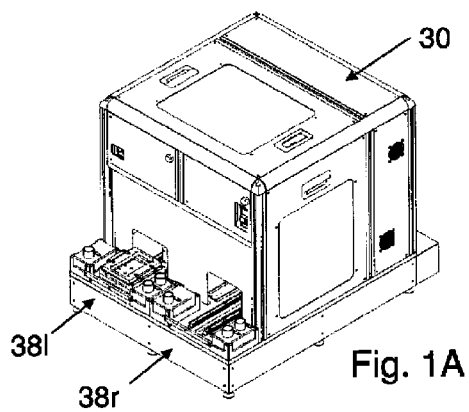
FIGS. 1A-1D are diagrammatic views of a typical thermal compression bonding machine of the type in which the pressure control mechanism of this invention may be used.
Figure 1B:
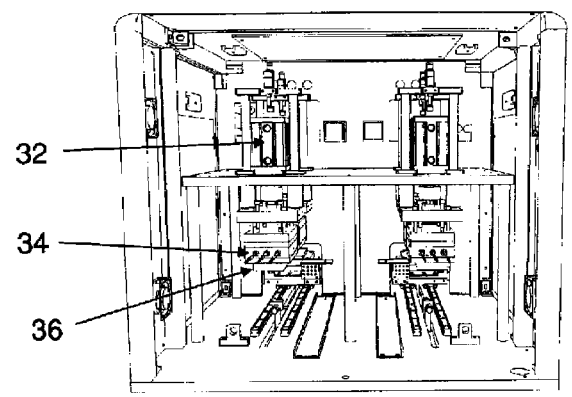
Figure 1C:
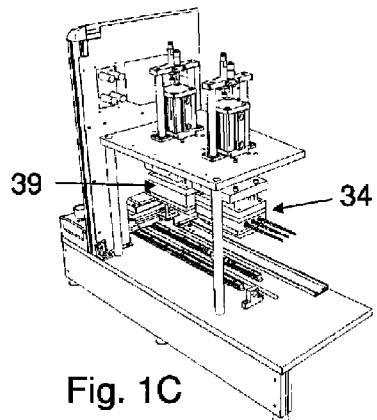
Figure 1D:
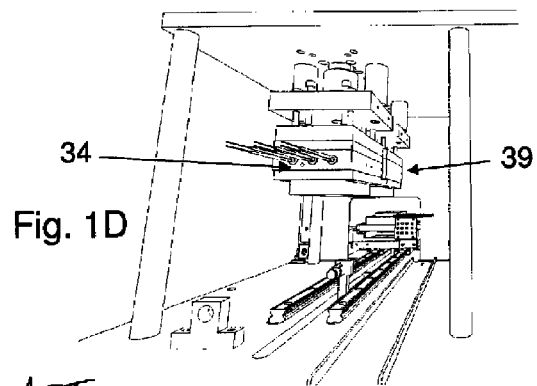

In the heating stage, the purpose is to heat the adhesive sandwiched between the top and bottom parts to a peak temperature range via conduction. Each heating block 34 is also attached to and carries a top fixture 36 as shown in FIG. 1B. The 3D surface of the top fixture 36 conforms to the 3D geometry of the top surface of the top part 42. A piston of a cylinder 42 pushes on the assembly of the heating block 34 and the top fixture 36 to cause the assembly to contact the stacked parts and to deliver heat.

The stroke length of the piston of the cylinder 32 that moves the top fixture is controlled by a micrometer adjustment on the cylinder (not shown) to compress springs 10 to a pre-determined or set length. The spring compression constant of each spring 10 and the compression length thereof provided by the movement of the heating block 34/top fixture 36 are used to calculate the overall force generated by springs 10 when the top fixture contacts and compresses the stacked assembly comprising the bottom part 40, sandwiched adhesive, and top part 42. This overall force is divided by the common contact area of two parts to estimate the pressure distribution. Again, the desired pressure distribution is achieved simply and easily by adjusting the spring compression distance which is controlled by the stroke length of the piston of the cylinder 32 that vertically moves the top fixture (see FIG. 1B). This method is preferred since it is independent of does not rely upon the input pressure to the cylinder 32 which is subject to fluctuation.

Pneumatic pistons 20 provide an additional means of delivering pressure to the parts. Pneumatic pistons 20 provide a certain range of force as a function of input air pressure. The force is distributed across an estimated effective area to deliver a desired pressure distribution.

As noted earlier, a plurality of pistons 20 are located strategically across the contact area of the parts (see FIG. 3). Once the air pressure is applied to cylinders 24, the heads 22 of pneumatic pistons 20 extend out through holes 26 in bottom fixture 16 applying force on the bottom surface of the bottom part. Pneumatic pistons 20 are activated while the stacked top and bottom parts are under compression by either the heating or the cooling fixture. Hence, the pneumatic pistons 20 deliver pressure to the stacked parts in addition to the pressure applied by the compression of springs 10.

Heads 22 of pistons 20 exert force on the bottom part to close the gaps created by the tolerances permitted in the top and bottom parts. In any given case, if the combined tolerances of the parts create a gap that is greater than the thickness of the adhesive, the adhesive bonding would be either incomplete or have lower than the targeted mechanical holding strength. Heads 22 of pistons 20 extend out from bottom fixture 16 and push on the bottom part which is bendable to close the gaps. The stroke length of each piston 20 is preferably some multiple (e.g. 2× or 3×) the combined measure of the total gap caused by the maximum parts tolerances permitted in the top and bottom parts and the adhesive thickness. Once the gaps are closed and all the parts including the adhesive are in contact, the collective force provided by pistons 20 is distributed over the effective contact area between the parts. The estimated effective contact area between the parts is preliminarily used to calculate the approximate pressure that should be provided by the pistons 20 over the parts.

In a thermal compression adhesive bonding process using thermoplastic bonding film, there are two (2) stages, heating and cooling. The two stages are utilized to create a temperature-time-pressure profile that is effective for the chosen adhesive. For a typical assembly of metal and plastic components, the gap in the Z-direction caused by the parts tolerance could be in the order of 0.1 mm or larger. The stamped metal parts have higher tolerance ranges in the order of ±0.05 mm to ±0.3 mm because of the spring-back effect of the sheet metal after the stamping process. Injection molded plastic parts have a Z-direction tolerance range that is approximately ±0.1 mm. The adhesive die-cuts sandwiched between the top and bottom parts have a typical thickness range in the order of 0.05 mm to 0.2 mm with its own thickness tolerance of ±10%. The mentioned dimension varies for different industries and precision of the tools For the thermoplastic bonding film the material softens during the heating stage and flows under compression during the heating and cooling cycles. During these cycles, the thickness of the thermoplastic film is reduced by about 30% to 60% following the principle of conservation of volume. For bonding metal and plastic components, the plastic component is at the bottom of the component stack and faces the pistons 20 which are imbedded in the bottom fixture 16. In the heating stage, the adhesive is heated to a peak temperature range that is higher than the softening point of the thermoplastic bonding film. During heating, the task is to heat the adhesive to a desired peak temperature range while avoiding the cosmetic defects caused by excessive flow of the softened adhesive. Hence, the pressure applied during heating is relatively low, 10 to 30 psi, and is adjusted for effective conduction heating. Too much pressure would press the softened adhesive to flow outside from the footprint of the parts and cause unwanted cosmetic defects. The combination of the springs 10 and pistons 20, or just the use of the springs 10 alone, could be used to achieve the necessary pressure distribution during the heating stage.

After heating, the parts are moved to a cooling stage within the bonding machine via an automated conveyor mechanism or manually by hand. Once the parts are at the cooling stage, the temperature of the thermoplastic bonding film at the beginning of the cooling cycle should be above the softening temperature range. The physical act of mechanically bonding the parts occurs at the cooling cycle. If the temperature at the beginning of the cooling cycle is below the softening temperature, the adhesive would have hardened sufficiently without bonding the two parts and the mechanical bonding would be incomplete. Hence, the temperature range of the thermoplastic bonding film needs to be higher than its softening temperature range at the start of the cooling cycle.

While the thermoplastic bonding film is in its softened state, pressure is applied to the stacked assembly to compress the stacked parts and the adhesive together for mechanical bonding. The pressure distribution along the common contact area of the parts needs to be controlled for effective uniform bonding while controlling the flow of the softened thermoplastic bonding film. Too much pressure could create an overflow situation causing cosmetic defects. Uneven pressure distribution could create partial overflow and result in inconsistent bonding strength. For a typical thermoplastic bonding film, the cooling pressure range is 25 to 45 psi. The combination of the springs 10 and pistons 20 is used to achieve the necessary pressure distribution and to close the gap that may exist between the plastic and metal.

Under the compression of the springs 10, pistons 20 exert force on the plastic bottom part which is bendable against the surface of the top metal part. This motion closes the gap and forces the Z-direction contour of the plastic to conform to that of the metal. As the thermoplastic adhesive cools the adhesive strength maintains the final bonded contour achieving bonding. Pistons 20 are extended at the start of the cooling cycle while the parts are under compression. The conduction cooling starts once the cooling fixture contacts the stacked parts. In most cases, compressed air is channeled to the cooling fixture to accelerate the cooling rate by convection.

Obviously, in a thermal compression bonding process having both a heating stage and a cooling stage, separate mechanisms 2 could be used in each stage given the different pressure distributions that must be applied in each stage. For example, in the heating stage noted above, a first mechanism 2 with a first set of springs 10 and pistons 20 could be provided to heat the adhesive to the proper target temperature. In the cooling stage noted above, a second mechanism 2 with a second set of springs 10 and pistons 20 could be used to force the parts together under higher pressure while the adhesive cools from above its softening temperature to below its softening temperature to mechanically join or bond the top and bottom parts together. If the pressure distribution is low enough, as in the heating stage, it might be possible for mechanism 2 to achieve the required distribution using only springs 10 and without having any pistons 20. However, at higher required pressure distributions, both springs 10 and pistons 20 would be preferably used in concert with one another.

However, it is preferred that such separate mechanisms 2 not be used since the parts being joined together would have to be transferred from one mechanism 2 to another mechanism 2 between the heating and cooling stages. Instead, it is preferred that the parts be nested together atop the bottom fixture 16 of a single mechanism 2, and this single mechanism be moved or conveyed from or between a heating station to a cooling station within the bonding machine. For the spring force provided by springs 10, the extension length of the individual cylinder at each of the heating and cooling stations, namely how far the cylinder that carries the top fixture is allowed to extend downwardly, is controlled independently using a caliper mechanism for each cylinder. Given the different push down distances provided by the top fixture cylinders at each station, the length of springs 10 and/or their compression constants can be chosen so that springs 10 can develop the pressure ranges that are needed for both heating and cooling. For the pneumatic pistons 20, separate control mechanisms would be provided for heating versus cooling to allow the pistons 20 to develop different forces at each station. One master solenoid and pressure regulators would be provided for heating and another solenoid and pressure regulators would be provided for cooling.

Mechanism 2 is also applicable for bonding using thermoset bonding films, pressure sensitive adhesive tapes and liquid dispensed adhesives. For adhesives that are not thermally activated, no heating stage is required and the springs 10 and pistons 20 need be selected only to uniformly apply a desired pressure distribution that is needed to bond the parts together using the type of adhesive sandwiched in between the parts.

For PSA tapes, appropriate thermal compression profiles could be used to increase the adhesion performance of both initial and final bonding strength. A thermal compression profile that creates the condition where PSA flows beyond a typical minor deformation from a mild finger pressure, approximately 15 to 30 psi, at room temperature increases the bonding strength. The Applicant has further discovered that applying heat in the heating stage to a PSA tape in the range of from 90° C. to 120° C. causes the adhesive to flow like a thick liquid, rather than merely softening as is the case at the lower temperatures of 30° C. to 50° C. as are typically used. As the Applicant has further discovered, when the adhesive is made to flow like a thick liquid by heating it at the much higher temperature range of from 90° C. to 120° C., the adhesion bonding strength is greatly increased, in some cases up to 2× the strength when the lower temperature range is used. This discovery of the advantages of using the higher temperature range of from 90° C. to 120° C. could be used in a thermal compression bonding machine even if the pressure control mechanism 2 of this invention is replaced by a conventional bottom fixture as known in the prior art.

In addition, mechanism 2 can be used in tacking machines only where thermal activation of an adhesive for light tacking of two parts together is the only function being performed by mechanism 2. In general adhesive bonding, a pressure distribution appropriate for each material needs to be controlled for effective and consistent bonding. The combination of springs 10 and pneumatic pistons 20 provides the control scheme to achieve proper pressure distribution. In addition, the pneumatic pistons 20 close the gaps created by the tolerance of the parts being joined together to increase the production yield and to achieve higher bonding performance and quality. The gaps could be caused by the imperfection of the tools and processes used to make such parts. As an example, injection molded parts could have 'sinks', localized thin sections, at certain locations because of the mold tool and injection process.

Pressure control mechanism 2 of this invention can also be used for ultrasonic welding applications. One issue with plastics welding using ultrasonic energy is parts tolerance (Z-direction) and imperfections of parts from the manufacturing process causing gaps. For effective ultrasonic welding, the parts to be welded need to be in physical contact for the ultrasonic energy to weld the areas of contact having energy directors. Known ultrasonic bonding methods apply high pressure in hope of making good contacts between the parts. However, such known ultrasonic bonding methods do not use individual pistons locally to improve the physical contact between the parts as in pressure control mechanism 2. Accordingly, the use of such localized pneumatic pistons 20 spread across the contact geometry of the parts would be a desirable improvement.

The localized pneumatic pistons 20 could be positioned at angles to the vertical rather than being substantially vertically straight up and down as shown in FIGS. 2-5. Such angled pistons (represented by the angled dotted line A in FIG. 5) could act either by themselves against the bottom part 40 or could act against movable 3D surfaces within the fixture which surfaces would then contact corresponding 3D surfaces on the parts. This would allow ultrasonic welding to be achieved at angled surfaces other than the typical perpendicular surface from the pressure direction of the main piston of a ultrasonic machine. In conjunction with the pressure control mechanism 2, the use of adhesives during the ultrasonic bonding allows assembly of dissimilar plastic materials. In typical ultrasonic welding of plastics, the plastic components need to be of same material. The use of the pressure control mechanism 2 and ultrasonic energy extends to assembly of other dissimilar materials such as metal to plastic with or without the use of adhesives.

Various other modifications will be apparent to those skilled in the art. Accordingly, the invention shall be limited only by the appended claims.

I claim:

1. A pressure control mechanism for use in a bonding machine that joins two superimposed and mated first and second parts together which parts have contacting portions that abut one another over a predetermined contact area, wherein the bonding machine includes a pair of fixtures with a first fixture contacting the first part and a second fixture contacting the second part during a bonding process, and wherein the bonding machine comprises a powered actuator for moving the first fixture towards the second fixture along an axis of movement to compress the parts against one another along the axis of movement to assist in joining the parts together during the bonding process along the contact area therebetween, which comprises:

(a) a base;

(b) a mounting plate movable relative to the base along the axis of movement, wherein the mounting plate carries the second fixture such that the mounting plate and the second fixture move together as a unit;

(c) a plurality of springs interposed between the base and the mounting plate which springs are compressed during the bonding process, and wherein the springs have a pre-selected compression constant such that the springs when compressed by a pre-determined distance during the bonding process will apply a pre-determined, calculated force over the contact area of the parts to achieve a desired pressure between the parts that is sufficient to substantially close any gaps between the parts occurring over the contact area to help ensure a good bond between the parts over the contact area;

(d) a plurality of powered pistons with each piston comprising a cylinder and a head that is extensible and retractable from the cylinder, and wherein the heads of the pistons engage against an exterior surface of the second part when the pistons are actuated to apply pressure to the parts in addition to the pressure imparted to the parts by the springs to further force the parts together along the contact area, wherein the cylinders of the piston are carried on and are movable with the unit comprising the mounting plate and the second fixture, and wherein the cylinders of the pistons terminate in input ends that are located in a cavity in the base underlying the mounting plate with the input ends of the cylinders being connected by hoses to a pressurized fluid source.

2. The mechanism of claim 1, wherein the pistons are pneumatic pistons and the pressurized fluid is compressed air.

3. The mechanism of claim 1, wherein the powered pistons are spaced apart relative to one another approximately uniformly over the contact area between the first and second parts.

4. The mechanism of claim 1, wherein the movable heads of at least some of the powered pistons move along axes that are parallel to the axis of movement of the powered actuator as the powered actuator forces the first and second parts together.

5. The mechanism of claim 1, wherein the movable heads of at least some of the powered pistons move along axes that are angled to the axis of movement of the powered actuator as the powered actuator forces the first and second parts together.

6. The mechanism of claim 1, wherein at least one of the fixtures is attached to a heating block at a heating station to heat the one fixture during the bonding process to heat an adhesive that is sandwiched between the superimposed and mated first and second parts.

7. The mechanism of claim 6, further including a cooling station at which at least one of the fixtures is attached to a cooling block to cool the one fixture during the bonding process to cool the adhesive after the adhesive has been first heated at the heating station.

8. The mechanism of claim 1, wherein an adhesive is sandwiched between the first and second parts, and wherein the first part, the sandwiched adhesive, and the second part are carried on and retained on the second fixture in a nested configuration.

9. A pressure control mechanism in a bonding machine that joins two superimposed and mated parts together which parts have contacting portions that abut one another over a predetermined contact area, the bonding machine comprising a powered actuator to compress the parts against one another along an axis of movement, which comprises:

(a) a fixture having a contact surface that abuts against an exterior surface of one of the parts during the compression of the parts against one another;

(b) a plurality of powered pistons carried on the fixture for movement with the fixture, wherein each piston comprises a cylinder and a head that is extensible and retractable from the cylinder, wherein the heads of the cylinders are extensible through the contact surface of the fixture to directly engage against the exterior surface of the one part to further help push the parts together and close any gaps occurring over the contact area therebetween, wherein the movable heads of at least some of the powered pistons move along axes that are angled in a non-parallel manner to the axis of movement of the powered actuator as the powered actuator forces the first and second parts together; and (c) a plurality of springs for moving the fixture along the axis of movement to further force the fixture against the exterior surface of the one part.

10. The mechanism of claim 9, wherein the powered pistons are spaced apart relative to one another approximately uniformly over the contact area.

11. The mechanism of claim 9, wherein the movable heads of at least some of the powered pistons move along axes that are parallel to the axis of movement of the powered actuator as the powered actuator forces the first and second parts together.

* * * * *